INVENTOR
HORACE L. SMITH, JR.

United States Patent Office 3,621,587
Patented Nov. 23, 1971

3,621,587
FREEZE DRYING APPARATUS
Horace L. Smith, Jr., Richmond, Va., assignor to
Smitherm Industries, Inc., Richmond, Va.
Filed Aug. 6, 1970, Ser. No. 61,772
Int. Cl. F26b 19/00
U.S. Cl. 34—92
13 Claims

ABSTRACT OF THE DISCLOSURE

Freeze drying apparatus including a vacuum chamber in which one or more radiators are disposed. A fluid heat transfer medium is circulated through the radiator to heat it to a temperature sufficiently high to sublime the moisture and/or other volatiles from the frozen material. The volatiles thus evolved are condensed and removed from the evacuated part of the apparatus by a suitable sorbent. After leaving the radiator(s), the heat transfer fluid is employed to heat and concentrate the sorbent and/or to generate steam for operating an absorption type refrigeration system for cooling the sorbent and is then reheated and recirculated to the radiators.

---

Figure 1:
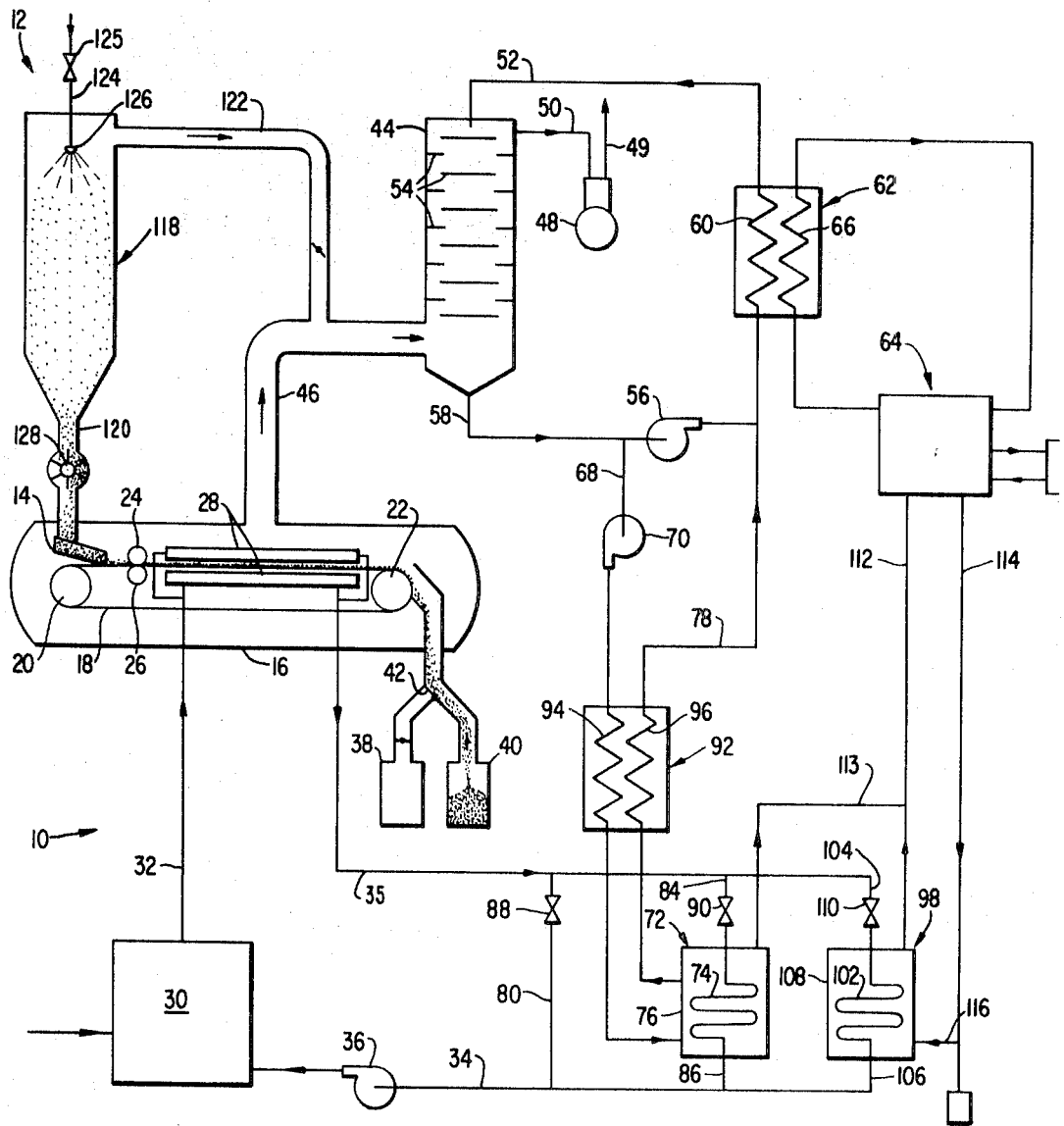

This invention relates to freeze drying apparatus and, more specifically, to continuous type freeze drying apparatus which is more efficient than that heretofore available.

Continuous type freeze dryers are disclosed in my prior Pats. Nos. 2,515,098 issued July 11, 1959; 3,266,169 issued Aug. 16, 1966; and 3,234,565 issued June 13, 1967. In the type of freeze dryers disclosed in these patents the material to be dried is frozen, introduced into a vacuum chamber, and deposited on one end of an endless belt conveyor. As the material moves through the vacuum chamber on this belt, the moisture is evolved from it by radiant heat emitted from one or more radiators adjacent the path of the material through the vacuum chamber.[1] The radiators are heated by circulating a fluid, preferably liquid, heat transfer medium through them.

As described in my earlier issued patents, the evolved moisture vapor may be removed from the evacuated part of the freeze drying apparatus by condensing and absorbing or dissolving it in a sorbent such as a cold lithium chloride brine. As the sorbent picks up evolved vapor, it becomes appreciably diluted. Accordingly, after the freeze drying apparatus has been in operation for a time, a part of the sorbent is diverted through a sorbent concentrator to boil off the water. This concentrated sorbent is then added to the remainder of the sorbent flowing to the heat exchanger in which the sorbent is cooled.

In the freeze drying apparatus described in the above-identified patents, the sorbent concentrator is directly heated or heated with hot liquid supplied from a direct fired boiler. I have now discovered that a significant increase in the operating efficiency of the type of freeze drying apparatus just described and also a reduction in initial equipment cost can be obtained by employing the heat transfer fluid discharged from the radiators in the vacuum chamber to supply heat to the sorbent concentrator. This fluid may also be employed to generate the steam for an absorption type refrigeration system, which can be utilized to cool the sorbent. Again, this will result in a significant increase in operating efficiency.

Other measures are also preferably taken to still further increase the efficiency of the apparatus. For example, condensate discharge from the absorption refrigeration system may be employed as make-up water for the steam generator to thereby make use of sensible heat which would otherwise be wasted. And the relatively cool sorbent flowing to the sorbent concentrator can be passed in heat exchange relationship to the hot sorbent flowing from the concentrator to the refrigeration apparatus to extract sensible heat (which would otherwise be wasted) from the hot sorbent.

From the foregoing it will be apparent that the primary object of the invention resides in the provision of novel, improved freeze drying apparatus of the continuous type.

Another important but more specific object of the invention is the provision of freeze drying apparatus in which a single heat transfer fluid is utilized to supply heat to at least two diverse types of heat using equipment.

Figure 2:
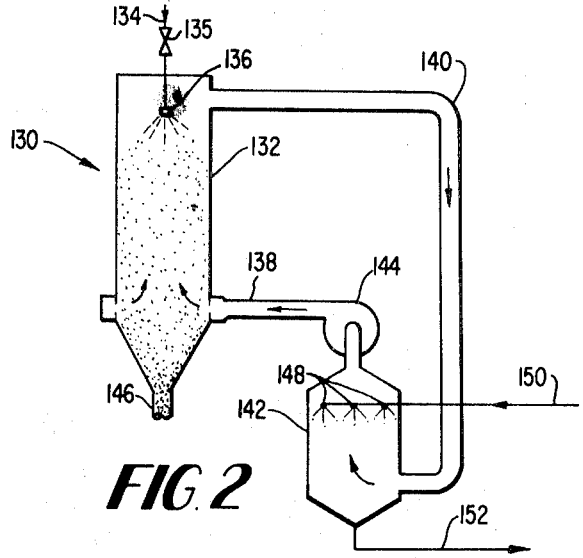

Other important objects and features and further advantages of the invention will become apparent from the appended claims and as the ensuing detailed description and discussion proceeds in conjunction with the accompanying drawing, in which:

FIG. 1 is a schematic illustration of freeze drying apparatus constructed in accord with the principles of the present invention; and FIG. 2 is a schematic illustration of an alternate form of apparatus for freezing the particles to be dried.

Referring now to the FIG. 1 of the drawing, freeze drying apparatus 10, which is constructed in accordance with the principles of the present invention, numbers among its major components a system 12 for freezing the material to be dried, preferably in the form of a finely divided powder. The frozen powder flows from the freezing apparatus onto a vibrating feeder 14 located in and at one end of an elongated vacuum vessel 16. Feeder 14 deposits the frozen product in a thin layer of uniform thickness on the inlet end of a conveyor including a thin, endless, stainless steel or similar belt 18 trained over a pair of spaced, rotatably mounted rollers or pulleys 20 and 22. Either one or both of these pulleys are driven by an appropriate power source (not shown). Belt 18 may be coated with a radiant energy absorbing material in the manner described in my issued Pat. No. 3,266,169 to facilitate the transfer of heat to the upper and lower sides of the product layer.

A pressure roll 24 and a back-up roll 26 are located immediately adjacent the outlet of vibrating feeder 14 to exert pressure on the frozen powder and thereby bond the particles to each other and to the upper surface of conveyor belt 18 in the manner described in my issued Pat. No. 3,324,565. As discussed in that patent, this substantially eliminates the heretofore vexing problem of particles of product bouncing or flying off the conveyor and building up inside the vacuum chamber. In addition, as also discussed in the patent just mentioned, fusion of the particles increases the conductivity of the product layer and, consequently, the rate at which heat is transferred to the center of the layer. Also, compression of the particles decreases the thickness of the product layer, materially increasing the rate at which the product can be dried. A further important advantage of passing the product between rolls 24 and 26 is that they compress the product layer to a uniform thickness so that the product is uniformly treated and variations in the dried product minimized or eliminated.

As the frozen product bonded to conveyor belt 18 is carried from rolls 24 and 26 through vacuum vessel 16 toward the end of the conveyor trained over roller 22, it is heated by radiators 28 disposed on opposite sides of the upper run of the conveyor (the radiators may be of any desired type such as, for example, those disclosed in my issued Pats. Nos. 3,262,494 issued July 26, 1966; 3,285,514 issued Nov. 15, 1966; and 3,305,011 issued

---

[1] For the sake of convenience reference will be made herein primarily to the removal of water from the materials being dried. As will be apparent to those skilled in the relevant arts, however, the apparatus disclosed herein may also be employed for the removal of other liquids, if desired.

Feb. 21, 1967). The interior of vacuum vessel 16 is maintained at a pressure below 0.180 inch of mercury absolute, a typical pressure being on the order of 0.0126 inch of mercury absolute. At this pressure the water in the product will, upon the application of heat, pass directly from the frozen state to the vapor state, i.e., sublime, at temperatures of $-20°$ F. or higher. The heat from radiators 28 therefore causes the moisture in the frozen product to sublime.

Radiators 28 are heated by circulating through them a fluid, preferably liquid, heat transfer medium. Suitable heat transfer liquids, capable of being to temperatures as high as $800°$ F. without an unacceptably high rate of degradation, are disclosed in my Pat. No. 3,236,292 issued Feb. 22, 1966.

The system for heating and circulating the heat transfer medium includes a liquid heater 30 connected to radiators 28 by supply, conduit 32 a return arrangement including conduits 34 and 35 and a pump 36 in a return conduit 34. This heating system will in actual practice also include a number of other components as will be apparent to those versed in the arts to which this invention relates. However, as such components are not part of the present invention and as they are described in Pat. No. 3,236,292 and elsewhere, they will not be referred to further herein.

Referring again to FIG. 1, from conveyor belt 18 the dried or dehydrated product flow into one of two discharge hoppers 38 or 40. A doctor blade (not shown) may be employed to scrape the dried material from belt 18. The flow of the dried product may be diverted into a selected one of the two hoppers by a selectively adjustable feeder vane 42 mounted between the two hoppers.

It is necessary for satisfactory operation to continuously remove the evaporated water from vacuum vessel 16 since, at 0.0126 in Hg abs. pressure and $-20°$ F., for example, each pound of water removed from the product occupies several thousand cubic feet. The system employed in the apparatus 10 of FIG. 1 for this purpose includes a condenser 44 connected to vacuum vessel 16 by a conduit 46 and to a vacuum pump 48 by a conduit 50. Vacuum pump 48, which is also used to pump down vacuum vessel 16 when the system is started up, draws the accumulated water vapor from vacuum vessel 16 through conduit 46 and upwardly through condenser 44, where it is condensed and absorbed by a refrigerated sorbent such as a lithium chloride solution or brine.[2] The sorbent is pumped through a conduit 52 into the upper end of condenser 44 and flows downwardly through condenser 44 over interleaved horizontal baffles 54.

The lithium chloride solution is in a chilled, concentrated state when it is circulated to condenser 44. In condensor 44 the solution is diluted by the condensed water vapor and heated by the latent heat given up as the water vapor condenses. Accordingly, it is necessary to make provision for concentrating and cooling the lithium chloride solution during the operation of system 10.

My issued Pats. Nos. 2,515,098; 3,266,169; and 3,324,565 disclose the use of ammonia compression type refrigeration systems for cooling the lithium chloride solution or other sorbent and the use of sorbent concentrators which are direct fired or steam heated to concentrate it. I have now discovered that greater efficiencies can be obtained and costs thereby reduced by employing the heat transfer liquid discharged from the radiators 28 in vacuum vessel 16 as the heat source for the sorbent concentrator. Also, if desired, an absorption type refrigeration system may be employed to cool the sorbent; and a portion of the heat transfer liquid discharged from radiators 28 may in this case be employed to generate steam to operate the refrigeration system.

Referring again to FIG. 1, the heated, dilute sorbent is recirculated by a pump 56 from condenser 44 through return conduit 58, a coil 60 in a heat exchanger 62, and conduit 52 back to the condenser during operation of freeze drying apparatus 10. Heat exchanger 62 is incorporated in an absorption type refrigeration system illustrated diagrammatically in FIG. 1 and identified by reference character 64. As the sorbent flows through heat exchanger 62, its temperature is reduced by a refrigerant flowing through the heat exchanger in a coil 66. Thus, the sorbent discharged from the condenser is cooled before it is recirculated to the condenser.

To keep the sorbent at the desired concentration, a portion of the diluted sorbent discharged from condenser 44 is diverted from conduit 58 through conduit 68 by pump 70. This liquid flows through conduit 68 to sorbent concentrator 72, which may be a conventional shell and tube type heat exchanger consisting of heating coils 74 in a shell or casing 76 (only one of which is shown). In sorbent concentrator 72, water is boiled off the sorbent to reconcentrate it. The concentrated sorbent then flows through conduit 78 to conduit 58 where it is combined with the sorbent circulated directly from condenser 44 to the heat exchanger 62 of refrigeration system 64.

Referring still to FIG. 1, the heating coils 74 in sorbent concentrator 72 are connected across return conduits 34 and 35 in parallel with a bypass conduit 80 by branch conduits 84 and 86. Valves 88 and 90 in bypass conduit 80 and branch conduit 84, respectively, can be adjusted to divert hot fluid exiting from radiators 28 through the heating tubes 74 and the sorbent concentrator to heat the diluted sorbent circulated through the casing 76 of this component.[3]

In a typical application of the present invention, the heat transfer liquid will be circulated to sorbent concentrator 72 at a temperature on the order of $600°$ F. However, this temperature will vary from application to application of the principles of the invention.

As will be apparent from the foregoing, the lithium chloride solution or other sorbent concentrated in sorbent concentrator 72 will be returned to the conduit 58 between condenser 44 and heat exchanger 62 at a relatively high temperature. This sorbent must be cooled before it is circulated to the condenser. Since the heat removed from this solution in the refrigeration system will be rejected, provision will preferably be made for removing as much sensible heat as possible from the concentrated sorbent before it is circulated to the refrigeration system heat exchanger.

In the freeze drying apparatus 10 illustrated in FIG. 1, a heat exchanger 92 is provided for this purpose. This heat exchanger includes two coils 94 and 96 disposed in heat transfer relationship. The diluted, relatively cool sorbent from condenser 44 flows to sorbent concentrator 72 through coil 94 in counterflow relationship to the concentrated, relatively hot sorbent flowing from the sorbent concentrator to heat exchanger 62 through coil 96. Accordingly, the hot, concentrated solution gives up heat to the weak, dilute solution, transferring to the latter sensible heat which would otherwise be rejected in refrigeration system 64.

As indicated above, the heat transfer liquid discharged from radiators 28 may also be employed as a heat source for refrigeration system 64. More specifically, with reference to FIG. 1, a steam generator 98 is connected in parallel with bypass conduit 80 and sorbent concentrator 72. Steam generator 98 may also be a conventional, shell and tube type heat exchanger consisting of tubes 102 connected to main return conduits 34 and 35 by branch conduits 104 and 106 together with a casing 108.

---

[2] Vacuum pump 48 also removes air leaking into the evacuated part of freeze drying apparatus 10 therefrom through discharge conduit 49.

[3] Bypass conduit 80 is provided so that the heat transfer medium can be returned directly from radiators 28 to liquid heater 30 when the system is started up as well as to regulate the rate of flow through the sorbent concentrator and/or other heat users incorporated in the freeze drying apparatus.

A valve 110 interposed in branch conduit 104 may be adjusted together with valves 88 and 90 to divert a part of the heat transfer liquid discharged from radiators 28 through the heating coils 102 in the steam generator. This heats water flowing through the casing 108 of the steam generator, producing steam which is delivered to refrigeration system 64 through steam conduit 112.[4]

Refrigeration apparatus 64 operates in conventional fashion. For this reason and because neither its components nor mode of operation are part of the present invention, it will not be described further herein except to point out that the steam supplied to it will ultimately be condensed in a vapor generator (not shown) and discharged through the system to a drain line 114. This hot condensate is preferably recirculated to steam generator 98 through a branch line 116 to recover sensible heat in the condensate, again contributing to the efficiency of freeze drying apparatus 10.

Referring again to FIG. 1, the system 12 by which the material to be dried is converted to a frozen powder includes a freezer vessel 118 connected to vacuum vessel 16 by feed conduit 120 and to vapor offtake conduit 46 by conduit 122. Accordingly, there is also a sub-atmospheric pressure in vessel 118. The product to be dried is sprayed into freezer vessel 118 through supply conduit 124[5] and spray nozzle 126. Because of the reduced pressure in vessel 118 the liquid particles exiting from the spray nozzle are frozen by autorefrigeration.

The frozen particles are fed by a rotary feeder 128 through feed conduit 120 onto vibrating feeder 14.

Vapors evolving from the product as it freezes pass through offtake conduits 122 and 46 into condenser 44. Here they are condensed and removed from the evacuated portion of the system in the manner described previously.

In some applications of the present invention, it will be preferable to retain the volatile constituents of the product which is to be freeze dried. In this case, the alternate freezing arrangement 130 illustrated in FIG. 2 may be employed.

Referring now to the figure just mentioned, freezing system 130 includes a freezer vessel 132 into which a product is introduced through a supply line 134, in which a flow controlling valve 135 is interposed and a spray nozzle 136 as in the embodiment of the invention discussed above. Connected to vessel 130 by supply and return conduits 138 and 140 is a cooler 142 for an inert gas, which is circulated to the vessel 132 just described by a blower 144. The cold gas flows upwardly through vessel 132 in counterflow relationship to the particles of product falling downwardly through the vessel from spray nozzle 136. This freezes the particles without the evolution of volatiles.

The frozen particles flow through supply conduit 146 to the vacuum vessel of the drying system. The gas, heated by the latent heat given up by the particles as they freeze, flows through return conduit 140 back to the gas cooler.

As shown in FIG. 2, spray nozzles 148 are disposed in cooler 142. These are supplied with the cold lithium chloride solution or other sorbent through line 150 as by connecting the latter to a conduit such as that identified by reference character 52 in FIG. 1.

The lithium chloride spray absorbs heat from the gas circulated through the cooler, reducing the temperature of the latter, and then flows through drain conduit 152 into a return conduit such as that identified by reference character 58 in FIG. 1 to return the sorbent to a heat exchanger where it can in turn be cooled.

Many modifications can of course be made in the exemplary systems discussed above without exceeding the principles of the present invention, which are concerned ---
[4] Steam is also generated in sorbent concentrator 72. As shown in FIG. 1, this steam may be added to that produced in steam generator 98 via a steam conduit 113 connected between steam generator casing 108 and steam supply conduit 112.

[5] A valve 125 can be adjusted to control the rate of flow through conduit 124.

primarily with increasing the efficiency of freeze drying systems by reducing the number of heat sources they employ. For example, in some applications of the invention, it may prove advantageous to employ a compression type refrigeration system rather than the absorption refrigeration system illustrated in FIG. 1. In other applications of the invention, it may prove advantageous to use the heat transfer medium discharged from the radiators in the vacuum vessel to operate a steam generator for an absorption refrigeration system and to employ a separate heat source to operate the sorbent concentrator. These and other modifications of a similar nature, which will readily occur to those versed in the arts to which the present invention relates, are fully intended to be covered in the appended claims to the extent they are not expressly excluded therefrom.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. Freeze drying apparatus comprising a vacuum chamber; means for introducing material to be dried into said chamber; means for discharging dried material therefrom; means in said vacuum chamber for heating the material therein to sublime volatiles from said material, said heating means comprising at least one radiator adapted to have a fluid heat transfer medium circulated therethrough; means for circulating a sorbent into contact with the volatiles sublimed from the material being dried to thereby effect a removal of the sublimed volatiles from said vacuum chamber; and means including a sorbent concentrator for circulating heat transfer fluid exiting from said radiator into heat exchange relationship with said sorbent to heat the sorbent and thereby vaporize the volatiles removed from the vacuum chamber by said sorbent.

2. The apparatus of claim 1, together with an absorption type refrigeration system for cooling the sorbent before it is contacted with the volatiles evolved from the material being dried and means for supplying the vapor generated by heating the sorbent to said refrigeration system to operate said system.

3. The apparatus of claim 2, together with a vapor generator; means for circulating a portion of the heat transfer fluid exiting from the radiator in the vacuum chamber to said vapor generator to generate vapor therein; and means for combining such vapor with that delivered to the absorption type refrigeration system from the sorbent concentrator.

4. The apparatus of claim 3, together with means for draining condensed vapors from the refrigeration system and means for supplying condensate from said drain means to said vapor generator.

5. The apparatus of claim 2, wherein the refrigeration system includes a heat exchanger and means for circulating cooled refrigerant to said heat exchanger and wherein the apparatus also includes means for circulating sorbent from the sorbent concentrator through the heat exchanger to thereby cool said sorbent before it is recirculated into contact with vapor evolved from the material being dried.

6. The apparatus of claim 5, together with a heat exchanger; means for circulating vapor laden sorbent through said heat exchanger before it enters the sorbent concentrator; and means for circulating sorbent from the sorbent concentrator to the heat exchanger in the refrigeration system through said heat exchanger, whereby sensible heat will be transferred to the sorbent flowing to the sorbent generator from the sorbent flowing therefrom.

7. The apparatus of claim 2, together with means for circulating at least part of the sorbent contacted with vapor evolved from the material being dried directly to said refrigeration system.

8. The apparatus of claim 1, together with a liquid heater and means for circulating the heat transfer fluid from said sorbent concentrator through said heater and then to the radiator in the vacuum chamber.

9. The apparatus of claim 1, together with means for evacuating non-condensible vapors from the vacuum chamber.

10. The apparatus of claim 1, wherein the means for introducing the material to be dried into said vacuum chamber includes a vessel; means for spraying the material to be dried into said vessel; means for evacuating said vessel to a sufficiently low pressure to cause said material to freeze by autorefrigeration; means for delivering the frozen material to the vacuum chamber; and means for circulating the sorbent into contact with the volatiles given off by said material as it freezes to thereby remove said volatiles.

11. The apparatus of claim 1, wherein the means for introducing the material to be dried into the vacuum chamber comprises a vessel; means for spraying the material to be dried into said vessel; means for circulating a cold gas through said vessel to freeze the spray particles; means for delivering the frozen particles to the vacuum chamber; and means for circulating the gas exiting from said vessel through a spray of the sorbent to reduce the temperature of the gas before it is recirculated to said vessel.

12. Freeze drying apparatus comprising a vacuum chamber; means for discharging dried material from said vacuum chamber; means in said vacuum chamber for heating the material therein to sublime volatiles from said material, said heating means comprising at least one radiator adapted to have a fluid heat transfer medium circulated therethrough; means for circulating a sorbent into contact with the volatiles sublimed from the material being dried to thereby effect a removal of sublimed volatiles from the vacuum chamber; an absorption type refrigeration system for cooling the sorbent before circulating it into contact with the volatiles sublimed from the material being dried; a vapor generator; means for circulating the fluid heat transfer medium from the radiator in the vacuum chamber to the vapor generator to effect the generation of vapor therein; and means for supplying said vapor to the refrigeration system to operate said system.

13. The apparatus of claim 12, together with means for circulating a part of the heat transfer fluid exiting from the radiator in the vacuum chamber into heat transfer relationship with said sorbent to heat the sorbent and thereby vaporize the volatiles removed from the vacuum system by the sorbent; and means for supplying the vapor thus generated to the refrigeration system.

References Cited
UNITED STATES PATENTS

| | | | |
|---|---|---|---|
| 3,324,565 | 6/1967 | Smith, Jr. | 34—5 |
| 3,270,432 | 9/1966 | Barbareschi | 34—5 X |

FREDERICK L. MATTESON, JR., Primary Examiner

W. C. ANDERSON, Assistant Examiner

UNITED STATES PATENT OFFICE
CERTIFICATE OF CORRECTION

Patent No. 3,621,587     Dated November 23, 1971

Inventor(s) Horace L. Smith, Jr.

It is certified that error appears in the above-identified patent and that said Letters Patent are hereby corrected as shown below:

Column 3, line 12, after "being" insert --heated--.
(not amended)

Signed and sealed this 7th day of November 1972.

(SEAL)
Attest:

EDWARD M. FLETCHER, JR.          ROBERT GOTTSCHALK
Attesting Officer                Commissioner of Patents